(12) United States Patent
Dau et al.

(10) Patent No.: US 6,550,561 B2
(45) Date of Patent: Apr. 22, 2003

(54) FULL AUXILIARY CHASSIS

(75) Inventors: Wolfram Dau, Wolfsburg (DE);
Dag-Arnulf Schlaf, Gifhorn (DE);
Michael Bock, Braunschweig (DE);
Wolfgang Lange, Wolfsburg (DE);
Andreas Bauer, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/989,280

(22) Filed: Nov. 20, 2001

(65) Prior Publication Data
US 2002/0029921 A1 Mar. 14, 2002

Related U.S. Application Data

(63) Continuation of application No. PCT/EP00/04059, filed on May 5, 2000.

(30) Foreign Application Priority Data

May 22, 1999 (DE) .......................................... 199 23 693

(51) Int. Cl.[7] .............................. B60K 1/00; B60D 21/00
(52) U.S. Cl. ...................... 180/299; 180/291; 180/312; 280/784
(58) Field of Search ................................. 180/312, 291, 180/299, 232; 280/781, 784, 785, 124.109; 296/204

(56) References Cited

U.S. PATENT DOCUMENTS 3,520,550 A * 7/1970 Dysarz et al. ............... 280/784
4,240,517 A * 12/1980 Harlow et al. .............. 180/295

(List continued on next page.)

FOREIGN PATENT DOCUMENTS

| DE | 1641281 | 9/1949 | |
| DE | 2712083 | 9/1978 | |
| DE | 3340973 | 11/1983 | |
| DE | 3522447 | 7/1986 | |
| DE | 3925990 | 7/1992 | |
| DE | 4129538 | 3/1993 | |
| DE | 4230669 A1 * | 3/1994 | ........... B62D/21/15 |
| DE | 4429438 | 2/1995 | |
| DE | 19524758 | 1/1997 | |
| DE | 19654571 | 7/1997 | |
| DE | 19703504 | 10/1997 | |
| DE | 19802396 | 7/1998 | |
| EP | 0678441 | 10/1995 | |
| JP | 4208639 A * | 7/1992 | ........... B62K/5/04 |
| JP | 4317869 A * | 11/1993 | ........... B62D/21/02 |
| JP | 5338445 A * | 12/1993 | ........... B60K/5/12 |
| WO | 9619373 | 6/1996 | |

OTHER PUBLICATIONS

ATZ Automobiltechnische Zeitschrift 97, 1995, 9, S.516; Fig.17.
DE–AN: B 5269 II/63c eingeg. Am Jul. 31, 1952.

Primary Examiner—Lesley D. Morris
Assistant Examiner—Joselynn Y Sliteris
(74) Attorney, Agent, or Firm—Baker Botts LLP

(57) ABSTRACT

An auxiliary chassis for a motor vehicle is formed as a generally rectangular structure for holding an engine, transmission and other equipment. The auxiliary chassis is mounted to front end structural members at a position spaced from and below the structural member forming a further impact absorbing structure.

19 Claims, 2 Drawing Sheets

U.S. PATENT DOCUMENTS

| | | | | |
|---|---|---|---|---|
| 4,263,980 A | * | 4/1981 | Harlow et al. | 180/292 |
| 4,392,545 A | | 7/1983 | Harasaki et al. | 180/294 |
| 4,955,663 A | * | 9/1990 | Imura | 296/194 |
| 5,487,219 A | | 1/1996 | Ruehl et al. | 29/897 |
| 5,549,350 A | * | 8/1996 | Akiyama et al. | 296/195 |
| 5,580,121 A | * | 12/1996 | Dange et al. | 296/204 |
| 5,611,569 A | * | 3/1997 | Sekiguchi et al. | 280/124.109 |
| 5,899,498 A | | 5/1999 | Horton | 280/781 |
| 6,085,856 A | * | 7/2000 | Law et al. | 180/291 |
| 6,109,629 A | * | 8/2000 | Bortz et al. | 280/124.109 |
| 6,109,654 A | * | 8/2000 | Yamamoto et al. | 180/299 |
| 6,120,059 A | * | 9/2000 | Beckman | 180/312 |
| 6,131,685 A | * | 10/2000 | Sakamoto et al. | 180/232 |
| 6,193,274 B1 | * | 2/2001 | Brown et al. | 280/784 |
| 6,269,902 B1 | * | 8/2001 | Miyagawa | 280/781 |

\* cited by examiner

FULL AUXILIARY CHASSIS

This is a continuation of copending application International Appln. No. PCT/EP00/04059 filed May 5, 2000, now WO 00/71406A1 which is incorporated by reference herein. The International application was published in German on Nov. 30, 2000 by the International Bureau.

BACKGROUND OF THE INVENTION

DE 197 03 504 A1 discloses an auxiliary chassis for a motor vehicle, serving to enhance a transverse rigidity of the vehicle. The auxiliary chassis comprises side parts, each in turn comprising at least two points of articulation for swingable articulation of a transverse or oblique caster connected to a wheel mount and a monocoque transverse member arranged between the side parts, which, at installation of the auxiliary chassis in the motor vehicle, is offset from a line connecting the centers of the wheels. This auxiliary chassis is distinguished in that the cross-section of the transverse member comprises a half-open profile whose opening, at installation of the auxiliary chassis in the motor vehicle, points substantially in the direction opposed to the line connecting the wheel centers. The transverse member, when used in the front axle region, may serve as a bottom girt to accommodate an electrohydraulic pump system, an ABS/EDS device, and/or a standing heater. Also, the bottom girt may be utilized for attachment of hydraulic lines of the front brake circuit or other cabling.

DE 3,522,447 A1 shows a lengthwise member of a truck for the front part of a motor vehicle. A motor vehicle comprises two such lengthwise members, extending directly behind the bumper, which they support. The lengthwise members are connected in the front-end portion to a transverse member and in their rear end portion to a posterior transverse member. The forward one-third of the lengthwise member is releasably attached to the rear portion of the lengthwise member, so that the two anterior portions of the lengthwise member together with the transverse member form a structure capable of being pre-assembled to form a unit, with other vehicle components, such as the bumper, the radiator, a condenser, an air conditioning system, a metal plate for spotlights etc.

With the auxiliary chassis according to DE 4,129,538 A1 and the structure according to DE 3,522,447 A1, portions of the front carriage of a motor vehicle may be preassembled and installed as a unit in the bodywork of the vehicle. However, there is a considerable need for an additional, more efficient assembly of the vehicle parts, for assembly outlay is one of the substantial cost items in the production of a motor vehicle.

The object of the invention, then, is to configure a motor vehicle in such manner that assembly is substantially simplified and accelerated.

SUMMARY OF THE INVENTION

The full auxiliary chassis according to the invention serves to accommodate and suspend the engine, the transmission and other auxiliary parts, such as an electrohydraulic control device, a radiator, a guidance transmission, an ABS/EDS device or the like. The full auxiliary chassis includes a rear transverse member, a front transverse member, and two side members connected to form, a closed horizontal generally rectangular structure. This structural unit may be installed in the motor vehicle in the preassembled state, with engine, transmission and auxiliary equipment. This reduces assembly outlay considerably, since the complete powerplant with all auxiliaries can be preassembled in a module, this preassembly taking place independently of any passenger car assembly line. The prefabricated module is then placed in the vehicle and connected therewith in a single operation.

The result is a definite reduction of manufacturing time on the passenger car assembly line and a considerable reduction of costs. The productivity of a motor vehicle plant is thereby increased.

A further essential advantage of preassembling such a module on the full auxiliary chassis is that at preassembly, all parts to be assembled are readily accessible, since they are not covered by bodywork parts, thus improving quality. Specifically, robots may be employed to process the connections, performing these operations very dependably and economically. This permits a further reduction of costs with simultaneous improvement of quality.

In a preferred embodiment of the invention, the side members are connected to the transverse members by bolts, so that in the event of damage to a transverse or lengthwise member or to a unit connected to these, only a single transverse or lengthwise member, as the case may be, need be removed, and the corresponding transverse or lengthwise member or unit connected thereto replaced.

In another preferred embodiment of the invention, the front transverse member is of a generally horizontal U-shaped configuration in top view, with a long traverse section and two shorter legs extending generally in the lengthwise direction of the vehicle. The legs are integrally connected to the traverse. Thus, in the first place, in maintenance of the vehicle, a front subunit, bearing for example a radiator, intake air cooler and condenser, may be pulled from the engine compartment of the vehicle, and in the second place, the transverse member forms a stable unit that, in a collision, will transmit the energy of deformation to the lengthwise members, which will then deform correspondingly. In particular, the two legs may serve as deformation parts and accommodate a great deal of energy of deformation within a short travel. The auxiliary chassis according to the invention, therefore, provides additional collision protection in addition to the bumper itself.

The invention will now be illustrated by way of example with reference to the accompanying drawings.

DESCRIPTION OF THE INVENTION

Figure 1:
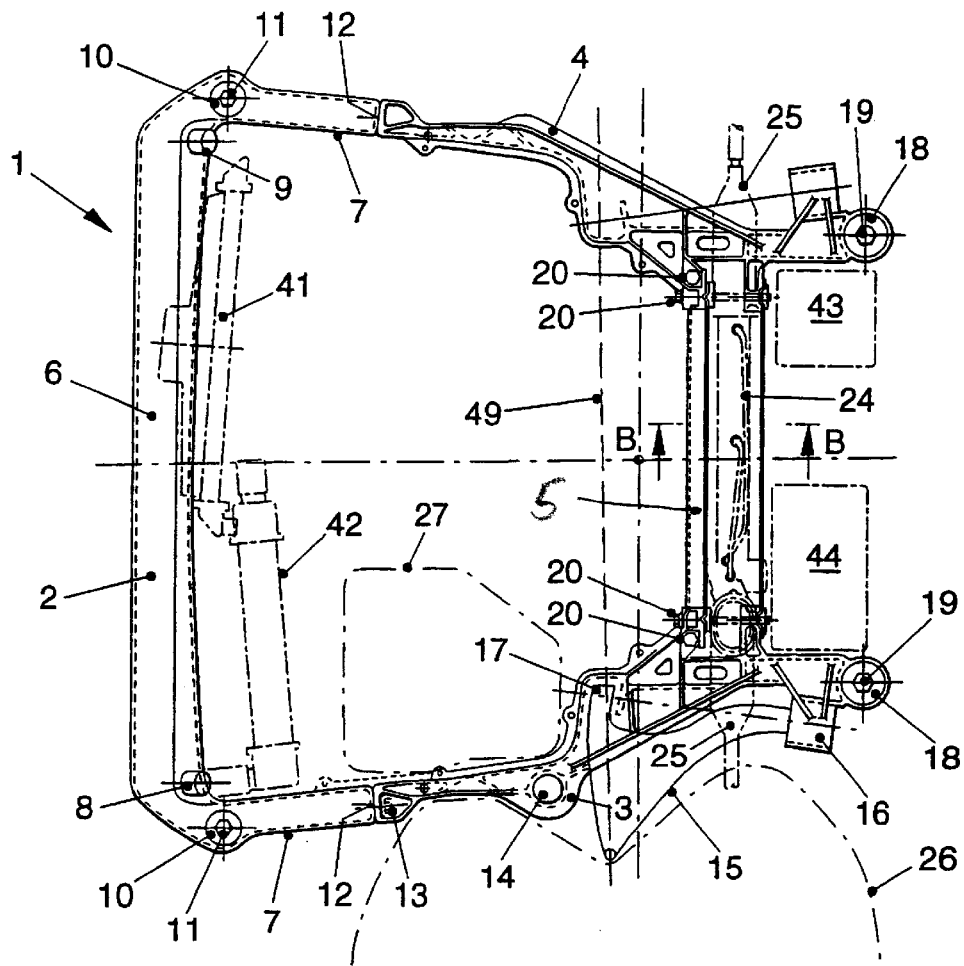
FIG. 1 shows a full auxiliary chassis according to the invention in top view.

The full auxiliary chassis 1 according to the invention includes a front transverse member 2, two lengthwise side members 3, 4 and a rear transverse member 5. The front transverse member is of U-shaped configuration in top view (FIG. 1) with a long traverse 6 and two shorter legs 7. The two legs 7 and the traverse 6 form an integral unit. The front transverse member is preferably configured as a part formed by means of internal high pressure, so that it bounds a cavity in its interior. On the front transverse member 2, near the ends of the long traverse 6, nozzles 8, 9 (inlet/outlet) may be arranged. The front transverse member 2 may be employed as an intake air duct to convey air from one side of the vehicle to the other side of the vehicle, and additionally as a sub-intake air cooler.

In the corner regions of the front transverse member 2 and somewhat outward from the nozzles 8, 9, there are accommodations 10 with vertical holes 11 for attaching the full auxiliary chassis to a motor vehicle.

The free ends of the legs 7 each comprise a vertical surface 12 in which a threaded hole is formed. On the frontal spaces 12, the lengthwise members 3, 4 are attached to vertical surfaces 12 with matching faces, and fastened by means of a bolt 13. The lengthwise members 3, 4 form a more or less rectilinear continuation of the legs 7, being angled somewhat inward in their rearward portion. At the vertex of the angling of the left lengthwise member 3 as viewed in the direction of travel, an accommodation 14 is provided for the transmission, meaning that the transmission is mounted at point 14.

The lengthwise members 3, 4 extend rearward some distance beyond the rear transverse member 5, and, in the region neighboring upon the rear transverse member 5, they comprise a form suitable for accommodation and lodgment of a transverse or oblique caster 15 with kits bearings 16, 17. The lengthwise members 3, 4, at their rear ends, comprise an additional accommodation 18 with through holes 19 for attaching the full auxiliary chassis 1 to the vehicle.

The lengthwise members 3, 4 are each attached to the rear transverse member 5 by several bolts 20.

The rear transverse member 5, in cross section, comprises a U-shaped form open upwards, having a floor segment 21 and two wall segments 22, 23. The forward wall segment 23 in the direction of travel is higher than the rearward wall segment 22 in the direction of travel and is cropped doubly angled rearward at its upper end. Preferably, the transverse member is configured according to the teaching of DE 197 03 504 A1, and arranged on the vehicle with respect to the drive axle.

At the rear transverse member 5, lines 24 are attached for the servo control. Above the rear transverse member, at a short distance, the steering gear 25 (shown dot-dashed) is arranged, the ends of its linkage extending beyond the transverse member 5.

The lengthwise members 3, 4 extend through a region very narrowly bounded spatially between the tire envelope curve 26 of the vehicle and the transmission. To simplify the drawing, FIG. 1 shows only the oil casing 27 of an automatic transmission, instead of the complete transmission. The tire envelope 26 encircles the outer boundary of the vehicle tire in all guidance positions. To provide a high strength of the lengthwise members 3, 4 in this narrow region, the cross-sectional form is of maximal size.

Figure 3:
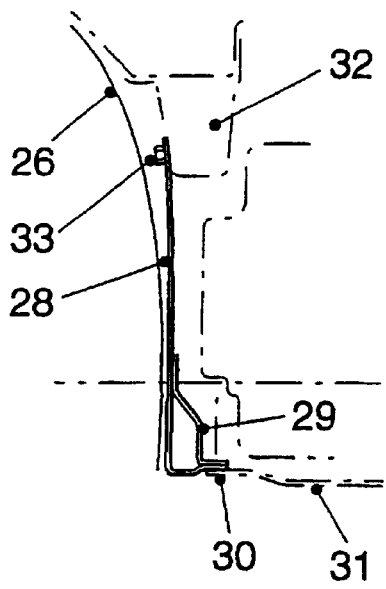
FIG. 3 shows a section of a lengthwise member along the line AA in FIG. 2 according to a first embodiment of the invention.

According to a first embodiment of the invention (FIG. 3), the side members 3, 4 consist of a sheet-metal structure having an outer sheet-metal shell 28 angled off inward at its bottom edge and an inner sheet-metal shell 29 welded to the outer sheet-metal shell 28 to make a hollow profile of more or less rectangular cross-section, having high rigidity by virtue of this spatial form. At the lower margin, the two sheet-metal shells 28, 29 form a welding flange 30 projecting horizontally inward toward the other side member and serving for attachment of a noise capsule 31. The outer shell 28 is drawn far upward for enhanced stability and may be attached to a lengthwise structural member 32 of the body assembly by means of a bolt 33.

Figure 4:
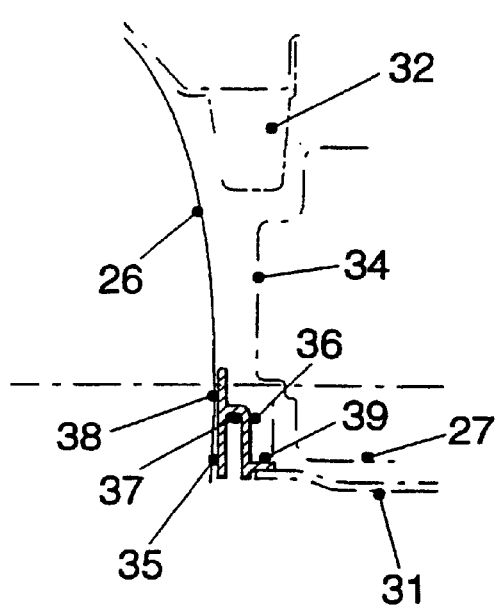
FIG. 4 shows a section of the lengthwise member along the line AA in FIG. 2 according to a second embodiment of the invention.
Figure 5:
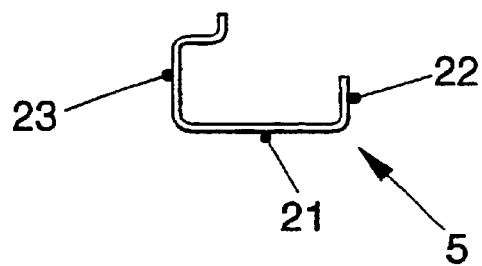
FIG. 5 shows a section of the transverse member along the line BB in FIG. 1.

Another embodiment of the side members 3, 4 is shown in FIG. 4, configured as a casting. These side members 3, 4 have a narrow but high U-shaped cross section, open at the bottom, fitting between the tire envelope 26, the oil casing 27 and a gear case 34. The lengthwise member 3, 4 thus consists of an outer side wall 35 and an inner side wall 36, and a top wall 37. The outer side wall 35, to enhance the rigidity of the lengthwise member 3, 4, is extended upward over the top wall 37 by means of a stiffening web 38. At the lower end of the inner side wall 36, a horizontal web 39 projecting inward toward the other side member is formed. This horizontal web 39 lends the lengthwise member 3, 4 a high moment of resistance to deflections in a horizontal plane. In addition, it can be employed to attach a bottom noise capsule 31.

Independently of the embodiment of the lengthwise members 3, 4, their bottom edges, especially in the front end region, may be configured as skids 40. The skids 40 preferably extend forward to beneath the rear end region of the legs 7 of the front transverse member 2, and are deeper than the extreme contour, so that upon vehicle contact with a curb, the skids will come into contact with the curb first, protecting the equipment.

Figure 2:
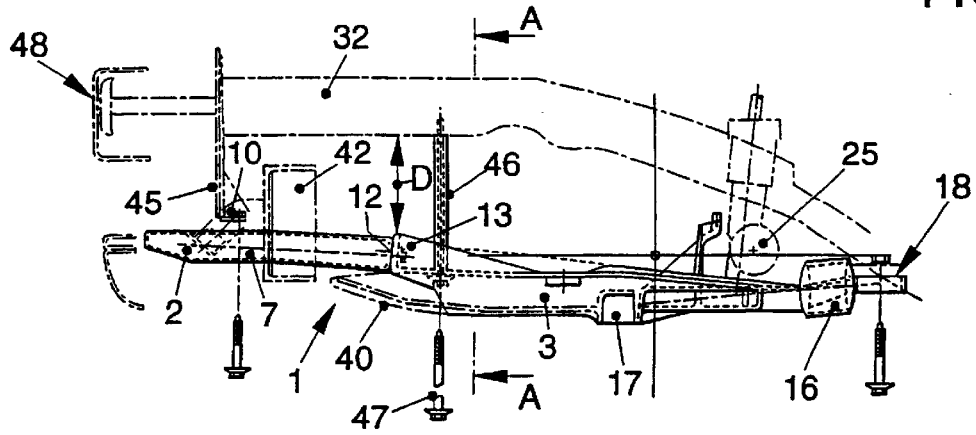
FIG. 2 shows the full auxiliary chassis of FIG. 1 in side view.

The full auxiliary chassis 1 according to the invention is preassembled as a module before installation in the vehicle, an engine, transmission and other auxiliary equipment being integrated onto the module. Examples of such auxiliary equipment are a radiator 41, an intake air cooler 42, an oil casing 27, a condenser, an electro-hydraulic control means 43 or an ABS/EDS device 44. The complete module is lifted at assembly from below into the vehicle bodywork on a conveyor belt, and rigidly connected to the lengthwise member 32. In so doing, the full auxiliary chassis is bolted at the accommodations 10 to a supporting and spacing plate 45 attached to the front end of the member 32 and fastened by means of a spacer tube 46 and a long bolt 47 to a front end structural member 32 of the vehicle body at front end of the side members 3, 4 and to the structural member 32 at the accommodations 18 at the rear end of the side members 3, 4. The full auxiliary chassis, at least in the forward region, is preferably arranged at a definite distance below the structural member 32, the distance D being about 20 to 40 cm (FIG. 2). At the front end of the structural member 32, a bumper 48 is attached. By the arrangement of the full auxiliary chassis 1 under the bumper 48, the full auxiliary chassis 1 forms a second shock-absorbing element in addition to the bumper 48.

In a collision, legs 7 of the front transverse member 2 act as deformation parts, capable of absorbing energy of deformation. In a severe collision, the lengthwise members 3, 4 may be deformed as well.

The screw connections between the full auxiliary chassis 1 and the structural members 32 are preferably designed to tear off in an accident, so that the deformation of the structural member 32 will not be limited by elements connected to the full auxiliary chassis, such as engine, transmission and the like. In this way, the structural members can absorb more energy of deformation before the passenger compartment is damaged. This may lead to a further enhancement of the safety of the vehicle.

The transmission attached to the lengthwise member 3 at the location 14 will detach from the lengthwise member 3 in a collision, and drop down, not interfering with the deformation of parts located above it.

The deformation behavior of the legs 7 serving as deformation parts and of the side members 3, 4 can be influenced by the location of the junctions between the full auxiliary chassis and the structural members 32. The farther back the connections are arranged, the longer the deformation part becomes, and the more energy of deformation it can absorb. The farther forward the connections lie, the more the front transverse member of the full auxiliary chassis 1 will act as additional bumper, able to bear against barriers and in particular to penetrate soft barriers.

With the full auxiliary chassis 1, the assembly of a vehicle is much accelerated, since the complete powerplant can be preassembled on the full auxiliary chassis. Here it is of advantage that the several connections are freely accessible, so that the employment of robots is possible. Furthermore, the entire powerplant module can be checked for defects prior to installation in the vehicle.

The full auxiliary chassis according to the invention leads to a definite reduction of manufacturing time and hence of manufacturing costs on the passenger car assembly line. Besides, a considerable gain in quality is realized.

Another advantage of the invention results from the fact that the accommodation 14 for the transmission is arranged on the lengthwise member 3 close to the front wheel axis 49 of the vehicle, keeping the starting and stopping torque small, as well as the resulting dipping or bobbing motion of the front carriage. This leads to increased riding comfort.

The invention has been illustrated in detail above in terms of an embodiment by way of example. However, the invention is not limited to this concrete example. The scope of the invention for example also includes an embodiment in which the front transverse member is not a monocoque part but a welded two-shell assembly.

What is claimed is:

1. A structural arrangement for a motor vehicle comprising:
    a vehicle body assembly including an impact absorbing front end structural member;
    an auxiliary chassis carrying a vehicle engine, transmission and other auxiliary equipment, said auxiliary chassis having front and rear transverse members joined to two side members forming a closed structure of generally rectangular horizontal configuration; and
    connecting members, including spacer elements for mounting said auxiliary chassis to said front end structural member at a position spaced from and below said front end structural member forming a further impact absorbing structure, wherein said spacer elements are formed by spacing plates and spacing tubes, wherein the front transverse member comprises vertical holes for attaching the auxiliary chassis to the spacing plates, said spacing plates being attached to a front end of said front end structural member of the vehicle body assembly; and
    wherein the auxiliary chassis is further arranged to be bolted to the vehicle body assembly at front ends of the side members by means of said spacing tubes and bolts.

2. A structural arrangement as specified in claim 1 wherein said spacing plates space said front transverse member from said front end structural member.

3. A structural arrangement as specified in claim 1 wherein said position is about 20 to 40 cm below said front end structure member.

4. A structural arrangement as specified in claim 1 wherein said front and rear transverse members are bolted to said side members.

5. A structural arrangement as specified in claim 1 wherein said front transverse member has a U-shape with a long transverse section and two shorter legs, and wherein said legs are joined to and continued by said side members.

6. A structural arrangement as specified in claim 1 wherein one of said side members includes a receptacle for receiving said transmission, said receptacle being arranged near an axis of front wheels of said vehicle.

7. A structural arrangement as specified in claim 1 wherein said front transverse member is formed using internal high pressure deformation as a hollow tubular structure.

8. A structural arrangement as specified in claim 7 wherein said tubular structure includes nozzles in lateral marginal regions of the front transverse member whereby said tubular structure may be used as a connecting tube.

9. A structural arrangement as specified in claim 1 wherein said side members comprise an outer sheet metal shell welded to an inner sheet metal shell enclosing a hollow interior.

10. A structural arrangement as specified in claim 9 wherein said outer shell extends upwardly to said front end structural member.

11. A structural arrangement as specified in claim 9 wherein said outer shell and said inner shell extend inwardly toward the other side member forming a horizontal flange.

12. A structural arrangement as specified in claim 1 wherein said side members comprise a U-shaped member open at the bottom, having inner and outer side walls connected by a top wall, wherein said outer side wall extends upwardly past said top wall, and wherein said inner side wall is provided with a horizontal extension toward said other side member.

13. A structural arrangement as specified in claim 12 wherein said side members are formed of sheet metal.

14. A structural arrangement as specified in claim 12 wherein said side members are castings.

15. A structural arrangement as specified in claim 1 wherein said side members have a forward end portion forming skids.

16. A structural arrangement as specified in claim 1 wherein said rear transverse member is U-shaped, open upwardly.

17. A motor vehicle having the structural arrangement of claim 1.

18. A motor vehicle as specified in claim 17 wherein said front end structural member comprises a longitudinal structural member.

19. A motor vehicle as specified in claim 18 wherein said longitudinal structural member carries a bumper at a front end thereof, and wherein said front transverse member is arranged below said front end of said longitudinal structural member under said bumper and forming an impact absorbing structure.

* * * * *